United States Patent
Hwang et al.

(10) Patent No.: US 10,783,712 B2
(45) Date of Patent: Sep. 22, 2020

(54) VISUAL FLAIRS FOR EMPHASIZING GESTURES IN ARTIFICIAL-REALITY ENVIRONMENTS

(71) Applicant: Facebook Technologies, LLC, Menlo Park, CA (US)

(72) Inventors: Albert Peter Hwang, Seattle, WA (US); Kenrick Cheng-Kuo Kin, Vancouver, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/020,391

(22) Filed: Jun. 27, 2018

(65) Prior Publication Data

US 2020/0005539 A1 Jan. 2, 2020

(51) Int. Cl.
| | |
|---|---|
| *G06T 19/00* | (2011.01) |
| *G02B 27/01* | (2006.01) |
| *G06F 3/01* | (2006.01) |
| *G06F 3/16* | (2006.01) |

(52) U.S. Cl.
CPC ........ *G06T 19/006* (2013.01); *G02B 27/0172* (2013.01); *G06F 3/013* (2013.01); *G06F 3/017* (2013.01); *G06F 3/167* (2013.01); *G02B 2027/0178* (2013.01)

(58) Field of Classification Search
CPC .... G06T 19/006; G02B 27/0172; G06F 3/013
See application file for complete search history.

(56) References Cited

U.S. PATENT DOCUMENTS

| | | | |
|---|---|---|---|
| 8,982,471 B1 * | 3/2015 | Starner | G02B 5/30 |
| | | | 359/13 |
| 2002/0037768 A1 * | 3/2002 | Ohshima | G06F 3/017 |
| | | | 463/30 |
| 2010/0194782 A1 | 8/2010 | Gyorfi et al. | |
| 2011/0248918 A1 * | 10/2011 | Yoo | G06F 3/011 |
| | | | 345/157 |
| 2013/0182077 A1 | 7/2013 | Holz | |
| 2013/0201276 A1 | 8/2013 | Pradeep et al. | |
| 2014/0035913 A1 | 2/2014 | Higgins et al. | |
| 2014/0091984 A1 | 4/2014 | Ashbrook et al. | |
| 2015/0085171 A1 * | 3/2015 | Kim | H04N 13/344 |
| | | | 348/333.04 |
| 2015/0146925 A1 * | 5/2015 | Son | 382/103 |
| 2015/0201124 A1 * | 7/2015 | Litvak | H04N 5/23219 |
| | | | 348/77 |
| 2015/0242101 A1 | 8/2015 | Ishino et al. | |
| 2016/0349849 A1 * | 12/2016 | Kwon | G06F 3/011 |

(Continued)

*Primary Examiner* — Grace Q Li
(74) *Attorney, Agent, or Firm* — Fenwick & West LLP

(57) ABSTRACT

A near eye display (NED) system is configured to present an augmented reality environment to the user. In addition, the NED system uses an imaging device to detect individuals within a local area, and identify positions of hands of the individuals from which the NED system may be able to detect one or more performed gestures. In response to detecting a predetermined gesture, the NED system displays a user of the NED one or more virtual objects corresponding to the identified first gesture at a location associated with a predetermined portion of the individual's body. The displayed virtual objects may be referred to as "visual flair," and are used to accentuate, stylize, or provide emphasis to gestures performed by individuals within the local area.

17 Claims, 7 Drawing Sheets

(56) References Cited

U.S. PATENT DOCUMENTS

| | | |
|---|---|---|
| 2017/0068416 A1 | 3/2017 | Li |
| 2017/0228120 A1* | 8/2017 | Phillips ................. G06F 3/0485 |
| 2017/0324841 A1 | 11/2017 | Clement et al. |
| 2017/0358144 A1 | 12/2017 | Schwarz et al. |
| 2018/0011543 A1 | 1/2018 | Funami |
| 2018/0075659 A1* | 3/2018 | Browy ................. G06T 19/006 |
| 2018/0322706 A1* | 11/2018 | Drouin ................. G06T 19/006 |
| 2018/0336008 A1 | 11/2018 | Nakagawa et al. |
| 2018/0342103 A1 | 11/2018 | Schwarz et al. |
| 2018/0350150 A1 | 12/2018 | Powderly et al. |
| 2018/0359448 A1 | 12/2018 | Harries |
| 2019/0026014 A1* | 1/2019 | Chapman ............ G06F 3/04847 |
| 2019/0107894 A1* | 4/2019 | Hebbalaguppe ... G06K 9/00355 |
| 2019/0146578 A1 | 5/2019 | Ikuta et al. |

\* cited by examiner

VISUAL FLAIRS FOR EMPHASIZING GESTURES IN ARTIFICIAL-REALITY ENVIRONMENTS

BACKGROUND

The present disclosure generally relates to a gesture and eye tracking system, and specifically visual flairs for emphasizing gestures in artificial reality environments.

Augmented reality systems typically rely on wearable devices that have smaller form factors than classical virtual reality (VR) head mounted devices. The use of augmented reality systems presents new challenges in user interaction. Previous methods of user interaction with the local area may not be sufficient or optimal in an augmented reality system. For example, without the use of augmented reality, a user may need to interact physically with a device in a local area in order to enable a change in that device. However, with the user of augmented reality, both the device and the user experience may be upgraded to allow the user to cause a change in the device using methods other than simply physical interaction. However, such changes in user experience should be intuitive for the user to understand and should be technically feasible. Current method of user interaction in augmented reality are not readily intuitive and do not exploit the technical capabilities of an augmented reality system, and thus are not optimal for use.

SUMMARY

Embodiments are directed to a near eye display (NED) system configured to present an augmented reality environment to the user. The NED system comprises an NED having an optical assembly having an electronic display that is configured to display images corresponding to virtual objects in accordance with display instructions, and an imaging device configured to capture one or more images of a portions of a local area of the NED. Using images captured by the imaging device, the NED system is able to detect individuals within a local area, and identify positions of hands of the individuals. Based on the identified hand positions, the NED system may be able to detect one or more gestures performed by the individuals in the local area.

For example, the NED system may identify a first gesture performed by the hand of the individual based upon a first set of determined positions of the hand, the first gesture corresponding to a predetermined sequence of one or more hand movements or hand positions, and, in response, update the display instructions to cause the electronic display to display, in an augmented reality environment as presented to a user of the NED via the electronic display, at least a first virtual object indicating the identified first gesture at a location associated with a predetermined portion of the individual's body associated with the first gesture. The displayed virtual objects may be referred to as "visual flair," and may be used to accentuate, stylize, or provide emphasis to gestures performed by individuals within the local area.

Figure 1:
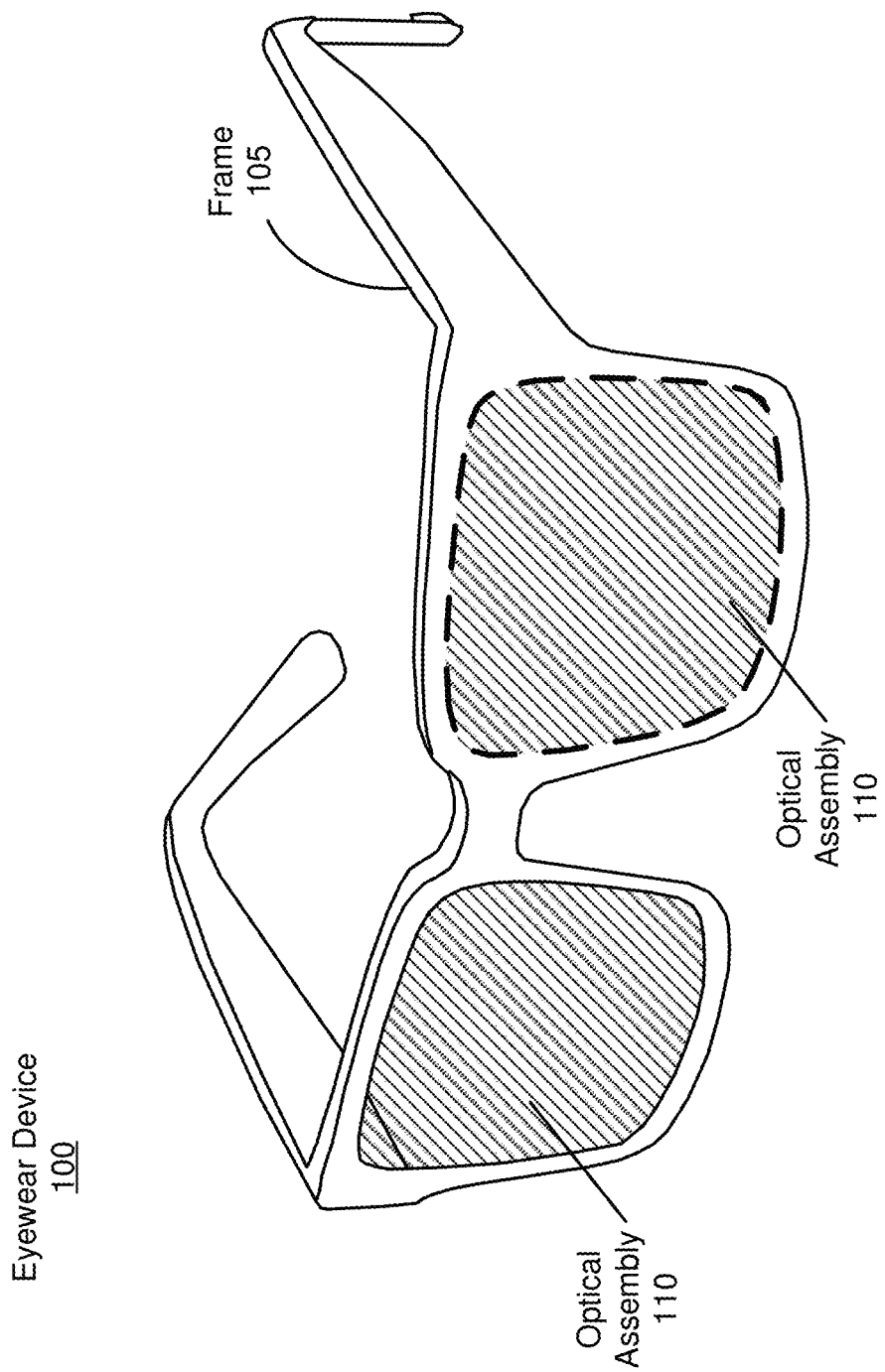
FIG. 1 is a diagram of an eyewear device, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In some embodiments, the near eye display (NED) system is configured to project artificial reality content to a user of the NED system. The NED system further includes a hand pose and gesture tracking system to determine hand positions and/or gestures performed by the user of the NED system and/or by other individuals with a local area of the NED system. Based upon the identified gestures, the NED system is able to present different types of AR content that may serve to enhance or emphasize the identified gestures. For example, the gesture tracking system of the NED system may identify that an individual in the local area has performed a specific type of gesture such as slapping a surface of a table, causing the NED system to display to the user a plurality of impact stars emanating from the point of impact, which may serve to emphasize the performed gesture to the user of the NED system. As such, the NED system is able to add different types of visual elements (referred to as "flair")

to an AR environment to emphasize, stylize, or accent various gestures performed by individuals in the environment.

As used herein, the local area of the NED system may refer to an area surrounding a NED of the NED system. In some embodiments, the local area of the NED system may refer to a 360° area surrounding a location of a NED of the NED system that would be potentially visible to a user of the NED at the location. In addition, while the following discussion refers primarily to AR content, it is understood that in other embodiments the NED system may display to the user VR content in a VR environment.

Near Eye Display System Overview

FIG. 1 is a diagram of an eyewear device 100, in accordance with one or more embodiments. In some embodiments, the eyewear device 100 is a near eye display (NED) for presenting media to a user. Examples of media presented by the eyewear device 100 include one or more images, text, video, audio, or some combination thereof. In some embodiments, audio is presented via an external device (e.g., speakers and/or headphones) that receives audio information from the eyewear device 100, a console (not shown), or both, and presents audio data based on the audio information. The eyewear device 100 can be configured to operate as an artificial reality NED. In some embodiments, the eyewear device 100 may augment views of a physical, real-world environment with computer-generated elements (e.g., images, video, sound, etc.).

The eyewear device 100 shown in FIG. 1 includes a frame 105 and an optical assembly 110, which is surrounded by a rim 115. The optical element 110 is substantially transparent (e.g., allows a percentage transmittance) in the visible spectrum and may also include a substantially transparent electronic display. The frame 105 is coupled to one or more optical elements. In some embodiments, the frame 105 may represent a frame of eye-wear glasses. The optical assembly 110 may be configured for users to see content presented by the eyewear device 100. For example, the eyewear device 110 can include at least one waveguide display assembly (not shown) for directing one or more image light to an eye of the user. A waveguide display assembly includes, e.g., a waveguide display, a stacked waveguide display, a stacked waveguide and powered optical elements, a varifocal waveguide display, or some combination thereof. For example, the waveguide display may be monochromatic and include a single waveguide. In some embodiments, the waveguide display may be polychromatic and include a single waveguide. In yet other embodiments, the waveguide display is polychromatic and includes a stacked array of monochromatic waveguides that are each associated with a different band of light, i.e., are each sources are of different colors. A varifocal waveguide display is a display that can adjust a focal position of image light emitted from the waveguide display. In some embodiments, a waveguide display assembly may include a combination of one or more monochromatic waveguide displays (i.e., a monochromatic waveguide display or a stacked, polychromatic waveguide display) and a varifocal waveguide display. Waveguide displays are described in detail in U.S. patent application Ser. No. 15/495,373, incorporated herein by references in its entirety.

In some embodiments, the optical assembly 110 may include one or more lenses or other layers, such as lenses for filtering ultraviolet light (i.e., sunglass lenses), polarizing lenses, corrective or prescription lenses, safety lenses, 3D lenses, tinted lenses (e.g., yellow tinted glasses), reciprocal focal-plane lenses, or clear lenses that do not alter a user's view. The optical assembly 110 may include one or more additional layers or coatings, such as protective coatings, or coatings for providing any of the aforementioned lens functions. In some embodiments, the optical assembly 110 may include a combination of one or more waveguide display assemblies, one or more lenses, and/or one or more other layers or coatings.

Figure 2:
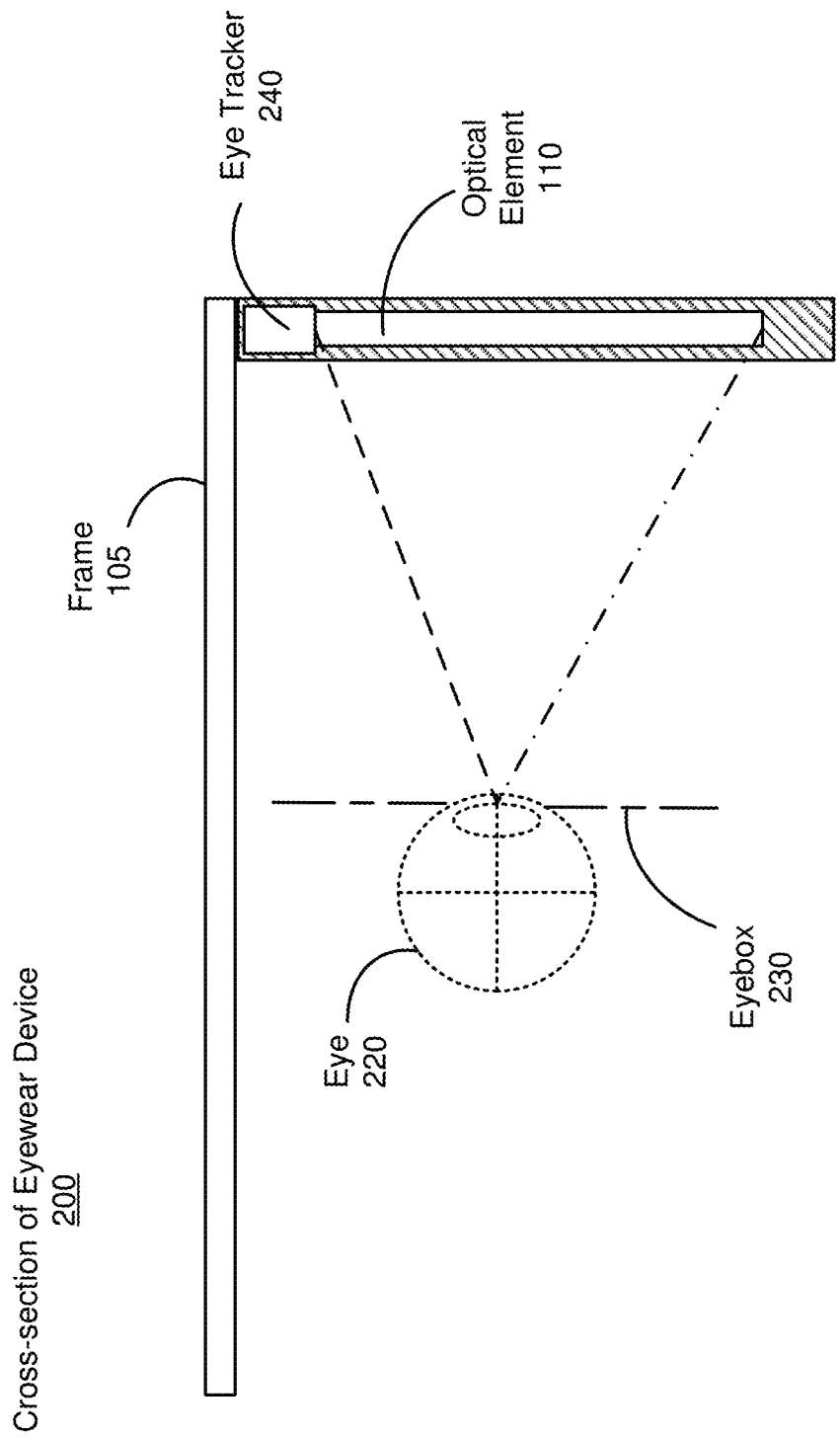
FIG. 2 is a cross section of the eyewear device of FIG. 1, in accordance with one or more embodiments.

FIG. 2 is a cross-section 200 of the eyewear device 100 illustrated in FIG. 1, in accordance with one or more embodiments. The optical assembly 110 is housed in the frame 105, which is shaded in the section surrounding the optical assembly 110. A user's eye 220 is shown, with dotted lines leading out of the pupil of the eye 220 and extending outward to show the eye's field of vision. An eyebox 230 shows a location where the eye 220 is positioned if the user wears the eyewear device 100. The eyewear device 100 includes an eye tracking system.

The eye tracking system determines eye tracking information for the user's eye 220. The determined eye tracking information may include information about a position of the user's eye 220 in an eyebox 230, e.g., information about an angle of an eye-gaze. An eyebox represents a three-dimensional volume at an output of a display in which the user's eye is located to receive image light.

In one embodiment, the eye tracking system includes one or more light sources to illuminate the eye at a particular wavelength or within a particular band of wavelengths (e.g., infrared). The light sources may be placed on the frame 105 such that the illumination from the light sources are directed to the user's eye (e.g., the location of the eyebox 230). The light sources may be any device capable of producing visible or infrared light, such as a light emitting diode. The illumination of the user's eye by the light sources may assist the eye tracker 240 in capturing images of the user's eye with more detail. The eye tracker 240 receives light that is emitted from the light sources and reflected off of the eye 220. The eye tracker 240 captures images of the user's eye, and the eye tracker 240 or an external controller can analyze the captured images to measure a point of gaze of the user (i.e., an eye position), motion of the eye 220 of the user (i.e., eye movement), or both. The eye tracker 240 may be a camera or other imaging device (e.g., a digital camera) located on the frame 105 at a position that is capable of capturing an unobstructed image of the user's eye 220 (or eyes).

In one embodiment, the eye tracking system determines depth information for the eye 220 based in part on locations of reflections of the light sources. Additional discussion regarding how the eye tracker 240 determines depth information is found in, e.g., U.S. application Ser. No. 15/456,383 and U.S. application Ser. No. 15/335,634, both of which are hereby incorporated by reference. In another embodiment, the eye tracker 240 does not include light sources, but instead captures images of the user's eye 220 without additional illumination.

The eye tracker 240 can be embedded in an upper portion of the frame 105, but may be located at any portion of the frame at which it can capture images of the user's eye. While only one eye tracker 240 is shown in FIG. 2, the eyewear device 100 may include multiple eye trackers 240 per eye 220.

By tracking the user's gaze, the eye tracker 240 can be used to determine where a user is looking at. This can be combined with a system, described below, which determines the gesture of the same user's hands. The combination of both a gaze and a particular gesture may be detected by the system and, in response, the system may perform some action based on the combination of gesture and gaze.

Figure 3:
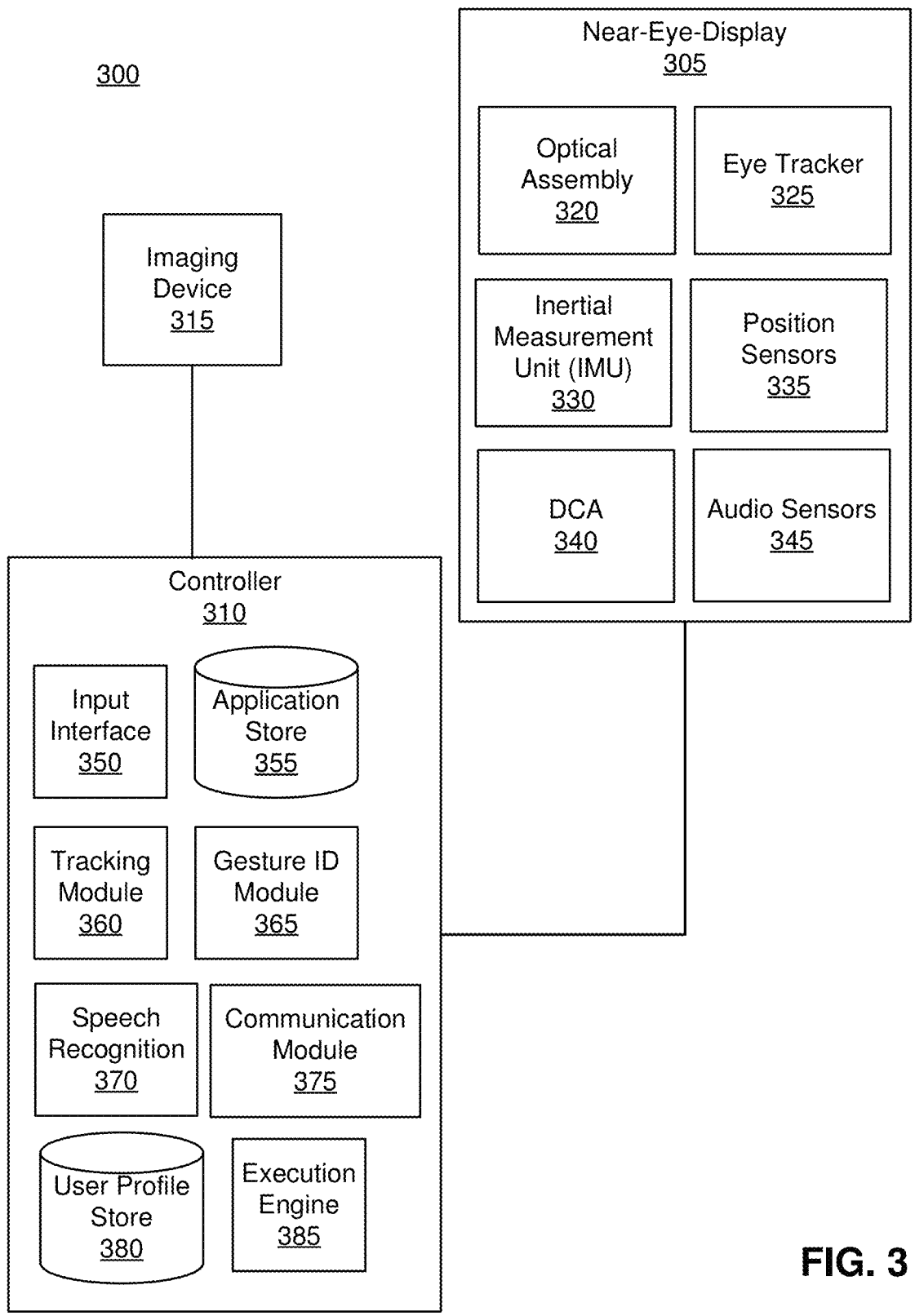
FIG. 3 is a block diagram of a NED system with an eye tracker, in accordance with one or more embodiments.

FIG. 3 is a block diagram of a NED system 300, in accordance with one or more embodiments-. The NED system 300 shown by FIG. 3 comprises a NED 305 coupled to a controller 310, with the controller 310 coupled to an imaging device 315. While FIG. 3 shows an example NED system 300 including one NED 305 and one imaging device 315, in other embodiments any number of these components may be included in the NED system 300. In alternative configurations, different and/or additional components may be included in the NED system 300. Similarly, functionality of one or more of the components can be distributed among the components in a different manner than is described here. For example, some or all of the functionality of the controller 310 may be contained within the NED 305. The NED system 300 may operate in an artificial reality environment.

The NED 305 presents content to a user. In some embodiments, the NED 305 is the eyewear device 100. Examples of content presented by the NED 305 include one or more images, video, audio, text, or some combination thereof. In some embodiments, audio is presented via an external device (e.g., speakers and/or headphones) that receives audio information from the NED 305, the controller 310, or both, and presents audio data based on the audio information. In some embodiments, the NED 305 operates as an artificial reality NED. In some embodiments, the NED 305 may augment views of a physical, real-world environment with computer-generated elements (e.g., images, video, sound, etc.).

The NED 305 includes an optical assembly 320 for each eye, an eye tracker 325, an inertial measurement unit (IMU) 330, one or more position sensors 335, and a depth camera array (DCA) 340. Some embodiments of the NED 305 have different components than those described here. Similarly, the functions can be distributed among other components in the NED system 300 in a different manner than is described here. In some embodiments, the optical assembly 320 displays images to the user in accordance with data received from the controller 310. In one embodiment, the optical assembly 320 is substantially transparent (e.g., by a degree of transmittance) to electromagnetic radiation in the visible spectrum.

The eye tracker 325 tracks a user's eye movement. The eye tracker 325 includes a camera for capturing images of the user's eye. An example of the placement of the eye tracker is shown in eye tracker 240 as described with respect to FIG. 2. Based on the detected eye movement, the eye tracker 325 may communicate with the controller 310 for further processing.

In some embodiments, the eye tracker 325 allows a user to interact with content presented to the user by the controller 310 based on the detected eye movement. Example interactions by the user with presented content include: selecting a portion of content presented by the controller 310 (e.g., selecting an object presented to the user), movement of a cursor or a pointer presented by the controller 310, navigating through content presented by the controller 310, presenting content to the user based on a gaze location of the user, or any other suitable interaction with content presented to the user.

In some embodiments, NED 305, alone or conjunction with the controller 310 or another device, can be configured to utilize the eye tracking information obtained from the eye tracker 325 for a variety of display and interaction applications. The various applications include, but are not limited to, providing user interfaces (e.g., gaze-based selection), attention estimation (e.g., for user safety), gaze-contingent display modes, metric scaling for depth and parallax correction, etc. In some embodiments, based on information about position and orientation of the user's eye received from the eye tracking unit, a controller (e.g., the controller 310) determines resolution of the content provided to the NED 305 for presentation to the user on the optical assembly 320. The optical assembly 320 may provide the content in a foveal region of the user's gaze (and may provide it at a higher quality or resolution at this region).

In another embodiment, the eye tracking information obtained from the eye tracker 325 may be used to determine the location of the user's gaze in the local area. This may be used in conjunction with a gesture detection system to allow the system to detect various combinations of user gesture and gazes. As described in further detail below, different combinations of user gaze and gestures, upon detection by the controller 310, may cause the controller 310 to transmit further instructions to devices or other objects in the local area, or execute additional instructions in response to these different combinations.

In some embodiments, the eye tracker 325 includes a light source that is used to project light onto a user's eye or a portion of the user's eye. The light source is a source of the light that is reflected off of the eye and captured by the eye tracker 325.

The IMU 330 is an electronic device that generates IMU tracking data based on measurement signals received from one or more of the position sensors 335. A position sensor 335 generates one or more measurement signals in response to motion of the NED 305. Examples of position sensors 335 include: one or more accelerometers, one or more gyroscopes, one or more magnetometers, another suitable type of sensor that detects motion, a type of sensor used for error correction of the IMU 330, or some combination thereof. The position sensors 335 may be located external to the IMU 330, internal to the IMU 330, or some combination thereof.

Based on the one or more measurement signals from one or more position sensors 335, the IMU 330 generates IMU tracking data indicating an estimated position of the NED 305 relative to an initial position of the NED 305. For example, the position sensors 335 include multiple accelerometers to measure translational motion (forward/back, up/down, left/right) and multiple gyroscopes to measure rotational motion (e.g., pitch, yaw, and roll). In some embodiments, the IMU 330 rapidly samples the measurement signals and calculates the estimated position of the NED 305 from the sampled data. For example, the IMU 330 integrates the measurement signals received from the accelerometers over time to estimate a velocity vector and integrates the velocity vector over time to determine an estimated position of a reference point on the NED 305. Alternatively, the IMU 330 provides the sampled measurement signals to the controller 310, which determines the IMU tracking data. The reference point is a point that may be used to describe the position of the NED 305. While the reference point may generally be defined as a point in space; however, in practice the reference point is defined as a point within the NED 305 (e.g., a center of the IMU 330).

The depth camera assembly (DCA) 340 captures data describing depth information of a local area surrounding some or all of the NED 305. The data that may be captured may include information captured from a structured light pattern projected on the local area, stereo images, time of flight data, or depth information captured using other depth measurement techniques. The DCA 340 can compute the depth information using the data (e.g., based on a captured portion of a structured light pattern), or the DCA 340 can send this information to another device such as the controller 710 that can determine the depth information using the data from the DCA 340.

The DCA 340 includes a light generator, an imaging device and a controller. The light generator of the DCA 340 is configured to illuminate the local area with illumination light in accordance with emission instructions. The imaging device of the DCA 340 includes a lens assembly, and a detector. The lens assembly is configured to receive light from a local area surrounding the imaging device and to direct at least a portion of the received light to the detector. The controller of the DCA 340 generates the emission instructions and provides the emission instructions to the light generator. The controller of the DCA 340 further determines depth information for the one or more objects based in part on the captured one or more images.

The imaging device 315 may be used to capture a representation of the user's hands over time for use in tracking the user's hands (e.g., by capturing multiple images per second of the user's hand). To achieve a more accurate capture, the imaging device 315 may be able to capture depth data of the local area or environment. This may be achieved by various means, such as by the use of computer vision algorithms that generate 3D data via detection of movement in the scene, by the emission of a grid pattern (e.g., via emission of an infrared laser grid) and detection of depth from the variations in the reflection from the grid pattern, from computation of time-of-flight of reflected radiation (e.g., emitted infrared radiation that is reflected), and/or from the user of multiple cameras (e.g., binocular vision, stereophotogrammetry). The imaging device 315 may be positioned to capture a large spatial area, such that all hand movements within the spatial area are captured. In one embodiment, more than one imaging device 315 is used to capture images of the user's hands. As described in further detail below, the captured images of the user's hands may be used to identify various gestures for the user. Upon detecting these gestures in combination with the satisfaction of other conditions, a controller may execute certain associated actions.

In another embodiment, the imaging device 315 may also capture images of one or more objects in the local area, and in particular the area encompassing the field of view of a user wearing an eyewear device that includes the NED 305. The imaging device 315 may also capture depth data of these one or more objects in the local area according to any of the methods described above.

Although the imaging device 315 is illustrated in FIG. 3 as being separate from the NED 305, in some embodiments the imaging device is attached to the NED 305, e.g., attached to the frame 105, and may also be part of the DCA 340.

The imaging device 315 may include one or more cameras, imaging sensors, one or more video cameras, any other device capable of capturing images, or some combination thereof. Additionally, the imaging device 315 may include one or more hardware and software filters (e.g., used to increase signal to noise ratio). Image tracking data is communicated from the imaging device 315 to the controller 310, and the imaging device 315 receives one or more calibration parameters from the controller 310 to adjust one or more imaging parameters (e.g., focal length, focus, frame rate, ISO, sensor temperature, shutter speed, aperture, etc.).

In some embodiments, the NED 305 may further comprise audio sensors 345. The audio sensors 345 may comprise a microphone or other type of sensor configured to capture audio data from the local area surrounding the NED 305. The audio data may include speech by the user of the NED system 300 or by other individuals within the local area, other types of noises within the local area, and/or the like. In some embodiments, the audio sensors 345 may be located separately from the NED 305.

The controller 310 provides content to the NED 305 for presentation to the user in accordance with information received from the imaging device 315 or the NED 305. In the example shown in FIG. 3, the controller 310 includes an input interface 350, an application store 355, a tracking module 360, a gesture identification (ID) module 365, a speech recognition module 370, and a communication module 375, a user profile store 380, and an execution engine 385. Some embodiments of the controller 310 have different modules than those described herein. Similarly, the functions further described below may be distributed among components of the controller 310 in a different manner than is described herein. In one embodiment, the controller 310 is a component within the NED 305.

In one embodiment, the controller 310 includes an input interface 350 to receive additional external input. These external inputs may be action requests. An action request is a request to perform a particular action. For example, an action request may be to start or end an application or to perform a particular action within the application. The input interface 350 may receive input from one or more input devices. Example input devices include: a keyboard, a mouse, a game controller, or any other suitable device for receiving action requests. In another embodiment, the input interface 350 receives input from one or more radio frequency (RF) signal receivers. These may be used to receive radio signals from RF identifiers in the local area, and in some cases to determine a distance (based on signal strength) and position (based on triangulation or other method) of the RF identifier. After receiving an action request, the controller 310 performs an action corresponding to the action request. In some embodiments, the action performed by the controller 310 may include haptic feedback, which may be transmitted via the input interface 350 to haptic feedback devices. In some embodiments, the input interface 350 may comprise a separate component in communication with the controller 310, such as a mobile device able to communicate wirelessly with the controller 310.

The application store 355 stores one or more applications for execution by the controller 310. An application is a group of instructions, that when executed by a processor, generates content for presentation to the user. Content generated by an application may be in response to inputs received from the user via movement of the NED 305, the input interface 350, the eye tracker 325, and/or the audio sensors 345. Examples of applications include: gaming applications, conferencing applications, video playback application, or other suitable applications. In some embodiments, the application store 355 may further store content generated by the one or more applications. In other embodiments, generated content may be stored in a separate content data store (not shown) implemented as part of the controller 310 or as an external device in communication with the controller 310.

The tracking module 360 tracks movements of the NED 305 and the hands of the user wearing the NED 305. To track the movement of the NED 305, the tracking module 360 uses information from the DCA 340, the imaging device 315, the one or more position sensors 335, the IMU 330, or some combination thereof. For example, the tracking module 360 determines a position of a reference point of the NED 305 in a mapping of a local area based on information from the NED 305. The tracking module 360 may also determine positions of the reference point of the NED 305 using data indicating a position of the NED 305 from the IMU 330. Additionally, in some embodiments, the tracking module 360 may use portions of data indicating a position or the NED 305 from the IMU 330 as well as representations of the local area from the DCA 340 to predict a future location of the NED 305. The tracking module 360 may provide the estimated or predicted future position of the NED 305 to the execution engine 385.

As noted, the tracking module 360 also tracks the user's hands, and the digits of the user's hands, in order to recognize various poses for the user's hand. Each pose indicates a position of a user's hand. By detecting a combination of multiple poses over time, the tracking module 360 is able to determine a gesture for the user's hand. These gestures may in turn translate into various inputs to the system. For example, a movement using a single digit in one direction may translate into a button press input in the system.

In one embodiment, the tracking module 360 uses a deep learning model to determine the poses of the user's hands. The deep learning model may be a neural network, such as a convolutional neural network, or a residual neural network. The neural network may take as input feature data extracted from raw data from the imaging device 315 of the hand, e.g., depth information of the user's hand, or data regarding the location of locators on any input device worn on the user's hands. The neural network may output the most likely pose that the user's hands are in. Alternatively, the neural network may output an indication of the most likely positions of the joints of the user's hands. The joints are positions of the user's hand, and may correspond to the actual physical joints in the user's hand, as well as other points on the user's hand that may be needed to sufficiently reproduce the motion of the user's hand in a simulation.

If the neural network outputs the positions of joints, the tracking module 360 additionally converts the joint data into a pose, e.g., using inverse kinematics principles. For example, the position of various joints of a user's hand, along with the natural and known restrictions (e.g., angular, length, etc.) of joint and bone positions of the user's hand allow the tracking module 360 to use inverse kinematics to determine a most likely pose of the user's hand based on the joint information. The pose data may also include an approximate structure of the user's hand, e.g., in the form of a skeleton, point mesh, or other format.

The neural network is trained using training data. In one embodiment, the training data is generated from a multiple camera array, such as multiple imaging devices 315, that captures hand movements in different poses with different hands from different users, and/or the locators on input devices worn by the different hands. The ground truth for this training data indicates joint positions and/or poses for the hands, and may be generated using human verification.

In one embodiment, the tracking module 360 is used to track movement of the digits of the user's hands and the hands themselves in order to recognize various gestures and poses for the user's hand. Each pose indicates a position of a user's hand. By detecting a combination of multiple poses over time, the tracking module 360 is able to determine a gesture for the user's hand. These gestures may in turn translate into various inputs to the system. For example, a movement using a single digit in one direction may translate into a button press input in the system.

An additional neural network may be used by the tracking module 360 to determine a gesture from a particular series of poses. Such a neural network may be similarly trained, using as input data computed poses (or joints) and with output data indicating the most likely gesture. Other methods may be used by the tracking module 360 to determine the gesture from the pose, such as a measurement of the distances and positions between the digits of the hand and the positions of a series of poses in 3D space. If these distances and positions of each pose fall within certain thresholds, the tracking module 360 may indicate that a particular gesture is present.

Using such a method, the tracking module 360 is able to determine the likely poses of a user's hands, and with the determination of the poses, the tracking module 360 may be able to match the movement of the user's hands with predefined gestures. These gestures may be used to indicate various actions in an augmented reality environment.

The gesture ID module 365 identifies the gestures of a user's hand based on the poses determined by the tracking module 360. The gesture ID module 365 may utilize a neural network to determine a gesture from a particular series of poses. Such a neural network may be trained using as input data computed poses (or joints) and with output data indicating the most likely gesture. Other methods may be used by the gesture ID module 365 to determine the gesture from the pose, such as a measurement of the distances and positions between the digits of the hand and the positions of a series of poses in 3D space. If these distances and positions of each pose fall within certain thresholds, the gesture ID module 365 may indicate that a particular gesture is present. In one embodiment, the gesture ID module 365 identifies a pinch gesture of the user. A pinch gesture is formed when distal ends of a user's index finger and thumb on one of the user's hands move within a threshold distance of each other. When the series of poses which form this gesture are recognized by the gesture ID module 365, the gesture ID module 365 determines that a pinch gesture is formed. As described in further detail below, the controller 310 may execute certain actions when an identified gesture is detected along with other conditions, such as a particular gaze direction of the user's eyes as determined by the eye tracker 325, audio data captured by the audio sensors 345, and/or the like.

Using such a method, the tracking module 360 is able to determine the likely poses of a user's hands, and with the determination of the poses, the gesture ID module 365 matches the movement of the user's hands with predefined gestures. These gestures may be used to indicate various actions in an artificial reality environment.

Additional details regarding the tracking and determination of hand positions using imaging devices and input devices are described in U.S. application Ser. No. 15/288,453, filed Oct. 7, 2016, and U.S. application Ser. No. 15/668,418, filed Aug. 3, 2017, both of which are incorporated by reference in their entirety.

In another embodiment, the tracking module 360 is also configured to recognize objects in images captured by the imaging device 315. To perform this function, the tracking module 360 may first be trained on a large corpus of labeled object data, or be coupled to a pre-trained image recognition system, which may be on an online system. In the former case, the tracking module 360 includes a machine learning model (e.g., a convolutional neural network) and is trained on a standard image-object library (e.g., ImageNet), or on a large set of user-provided images from an online system. These user-provided images may include a large number of images of objects, as well as a labeling of these objects (e.g., using captions, etc.). Alternatively, in the latter case, the online system itself already includes a machine learning model trained on the aforementioned user-provided and labeled images. For example, the online system may already have an object recognition system which receives images and outputs a label for each. The model on the online system is used instead of any model on the controller 310 to perform the object recognition in this case. After recognizing an object, the tracking module 360 may be able to track the location of the object in the field of view provided by the NED 305 to the user. This may be achieved by continuously recognizing users in each frame captured by the imaging device 315. Once an object is recognized, the tracking module 360 can indicate the location of the object, and the boundaries of the object (e.g., the pixels corresponding to the recognized object) in the captured image. This can be translated to a location of the object in the user's field of view provided by the NED 305 through the optical assembly 310.

In some embodiments, the controller 310 comprises a speech recognition module 370 configured to transcribe audio data received via one or more audio sensors 345. In some embodiments, the audio sensors 345 are able to record audio data corresponding to speech by the user of the NED system 300 or other individuals within the local area of the NED 305. The speech recognition module 370 uses one or more audio transcription algorithms to parse to received audio data and transcribe a transcription of the detected speech. In some embodiments, the transcription may be used to create or manipulate one or more content items, to display one or more virtual objects to the user of the NED 305, mapped to an executable command, and/or the like.

In some embodiments, the controller 310 comprises a communication module 375 for communication with other systems, such as other NED systems, allowing the NED system 300 to transmit and receive commands and/or content items with other systems through the communication module 375. For example, different users of different NED systems may be able to access and view different content items in their respective AR environments. The communication module 375 may allow for the first user of a first NED system 300 to transmit and share one or more content items with a second user of a second NED system (which may have a structure similar to that of the first NED system 300), allowing both users to view the same content. In some embodiments, the communication module 375 may transmit one or more commands to an external system based upon inputs received from a user (e.g., through the input interface 350, or through the performance of one or more gestures).

In some embodiments, the NED system 300 may be used by a plurality of different users. Each user of the NED system 300 may be associated with an account or user profile stored in a user profile store 385. The user profile store 385 stores user information corresponding to each user, such as user attributes, user preferences, content associated with the user, and/or the like. In some embodiments, the user profile store 385 stores permission information indicating content that may be viewed and/or modified by different users of the NED system 300. As such, different users of the NED system 300 may be able to view different content through the NED 305. For example, a first user of the NED system 300 may be able to view through an AR environment projected by the NED 305 virtual objects depicting images associated with a user profile of the first user, which would not be visible to a second user of the NED system 300 associated with a different user profile.

In some embodiments, instead of user profile information being stored in the user profile store 380, the NED system 300 may, using the communication module 375, access an online system such as a social network platform in order to access user profile information associated with different users. In some embodiments, the NED system 300 accesses the social network platform to identify social network connections between different users of the NED system 300. Based upon the social network connections, the NED system 300 may determine which types of content can be displayed to which users (e.g., content associated with a first user may be viewed by a second user having a "friend" relationship with the first user, but not by a third user having no social network connection to the first user).

In some embodiments, different users may concurrently use the NED system 300 via different NEDs 305. For example, the controller 310 may transmit display instructions to a first NED 305 to display a first AR environment to a first user, and to a second NED to display a second AR environment to a second user. As such, each of the first and second users may be able to view different virtual objects through their respective AR environments. In some embodiments, the NED system 300 may cause different content to be displayed in the first or second AR environments in response to detecting one or more predetermined gestures performed by the first and/or second users. For example, as discussed in greater detail below, the NED system 300 may, in response to detecting a particular gesture by the first user, display to the second user a visual flair emphasizing the gesture in the second AR environment. In some embodiments, the NED system 300 may, in response to a gesture by the first user, change the permissions of a content item such that the content item can be viewed by the second user in the second AR environment.

In one embodiment, the controller 310 additionally includes an execution engine 385. The execution engine 385 executes applications within the NED system 300 and receives position information, acceleration information, velocity information, predicted future positions, or some combination thereof, from the NED 305, input interface 350, and/or the tracking module 360. Based on the received information, the execution engine 385 determines content to provide to the NED 305 for presentation/display to the user. For example, if the received information indicates that the user has looked to the left, the execution engine 385 generates content for the NED 305 that is based off the user's movement in the artificial reality environment. Similarly, if information received from the tracking module 360 indicates the user's hand makes a particular gesture, the execution engine 385 generates content based on the identified gesture. In addition, if the information received from the NED 305 indicates a particular gaze of the user, the execution engine 385 may generate content based on that gaze. This content may include an update to the optical assembly 320 in the NED 305, such that content displayed to a user wearing the NED 305 changes.

The execution engine 385 may also perform an action within an application executing on the controller 310 in response to an action request received from the input interface 350 and provides feedback to the user that the action was performed. The provided feedback may be visual or audible feedback via the NED 305. For example, the execution engine 385 may receive an action from the input interface 350 to open an application, and in response, the execution engine 385 opens the application and presents content from the application to the user via the NED 305.

In one embodiment, the execution engine 370 determines the current pose of the user's hand based on raw joint data received from the tracking module 360. In another embodiment, the execution engine 370 detects the gestures of the user's hand based on the pose data. The methods in which the execution engine 370 determines poses and gestures are similar to the methods described above for the tracking module 360. In one embodiment, the execution engine 370 performs object recognition similar to the method described above for the tracking module 360.

In addition to determining the current pose of the user's hand(s), the execution engine 385 may also provide output to the optical assembly 320 in accordance with a set of display instructions (e.g., pixel data, vector data, etc.). This output to the electronic display of the optical assembly 320 may include a virtual recreation (using computer graphics) of the user's hands, as well as other objects (virtual or otherwise), such as outlines of objects in the local area, text, graphics, other elements that coincide with objects within a field of view of a user wearing the NED 305, and so on. In some embodiments, the execution engine 385 provides output to the optical assembly 320 to cause the optical assembly 320 to display one or more virtual objects to be displayed to user at locations corresponding to the position of the user's hands. For example, if a user performs a "pinch" gesture with their hand, the execution engine 385 may provide instructions to the optical assembly 320 to display a particular virtual object such that a corner of the virtual object remains between the thumb and index finger of the user's hand, even as the user moves their hand.

The execution engine 385 may receive from the tracking module 360 an indication of a tracked object. The tracking module 360 may be previously configured to recognize and track certain objects. These objects may provide some control functionality or may be associated with additional details or information. Upon receiving the indication of the tracked object, the execution engine 385 transmits display instructions to the optical assembly 320 to cause the optical assembly 320 to display various elements, such as contextual menus, control user interface elements, informational menus, and so on, to the user. These displayed elements may be shown at a threshold distance from the tracked object as viewed by the user in the augmented or artificial reality environment presented by the NED 305.

In one embodiment, the execution engine 385 may first recognize the recognizable objects in a local area as captured by the imaging device 315. An object may be recognized according to a pre-programmed recognition pattern. A recognition pattern may include a unique identifier of the object as generated by the object recognition system of the tracking module 360. The recognition pattern may include the values of the output parameters generated by the object recognition system that caused the tracking module 360 to recognize the object (e.g., the confidence weights generated by the object recognition system). In another embodiment, the recognition pattern may be some other fingerprint, pattern, identifier, or other data that is able to be used to recognize the object again under different orientation and lighting. When the object is encountered, the object recognition system of the tracking module 360 may generate another identifier based on the characteristics of the object. This identifier is compared to the stored recognition pattern for the object, and if a match occurs, the object is recognized as the object associated with the stored recognition pattern.

Additionally, in some embodiments, the execution engine 385 further utilizes additional tracking indicators in the local area to assist in the recognition of objects. As noted above, the objects in the environment may have RF identifiers, which may be received by the input interface 350 via one or more RF receivers. The execution engine 385, via the signals received from the RF receivers, and through various signal source locating mechanisms (e.g., triangulation, time-of-flight, Doppler shift), may determine the position of an object that has an RF identifier using the RF signals from the object. This information may be used to augment (e.g., adjust for error) the image based object recognition system, or may be used in place of the image based object recognition system (e.g., in the case where the image based object recognition system fails or has high error/uncertainty). Other tracking indicators, such as retroreflectors (which may respond to a non-visible light signal from the eyewear device 100), high contrast locators, QR codes, barcodes, identifying image patterns, and so on, may also be used by the execution engine 385 to assist in recognizing the object, and this information may be stored in the recognition pattern for the object. Upon recognition of the enhanced object, the execution engine 385 may update the display instructions of the optical assembly 320 to present additional simulated or virtual elements related to the enhanced object in the artificial reality environment presented by the NED system 300. The virtual elements may be positioned in the artificial reality environment at a threshold distance (e.g., 1 cm) of the enhanced object. The execution engine 385 may compute the position of the enhanced object in 3D space and project the virtual elements on the display such that they appear to be within the 3D space and near to the enhanced object (within the threshold distance). Upon detection of movement of the enhanced object, the execution engine 385 may submit updated display instructions to move the virtual elements based on the movement of the enhanced object.

In some embodiments, the one or more tracked objects may correspond to other individuals within the local area, such as users of other NEDs. The execution engine 385 may, as part of tracking the other individuals, identify gestures performed by the other individuals, and update the display instructions of the optical assembly 320 based upon the identified gestures. For example, the execution engine 385 may instruct the optical assembly 320 to display visual flair corresponding to the identified gestures. In some embodiments where the other individuals are users of other NED systems, the execution engine 385 may transmit or receive content with the other NED systems, based upon identified gestures performed by the user of the NED system 300 or by the users of the other NED systems.

Figure 4:
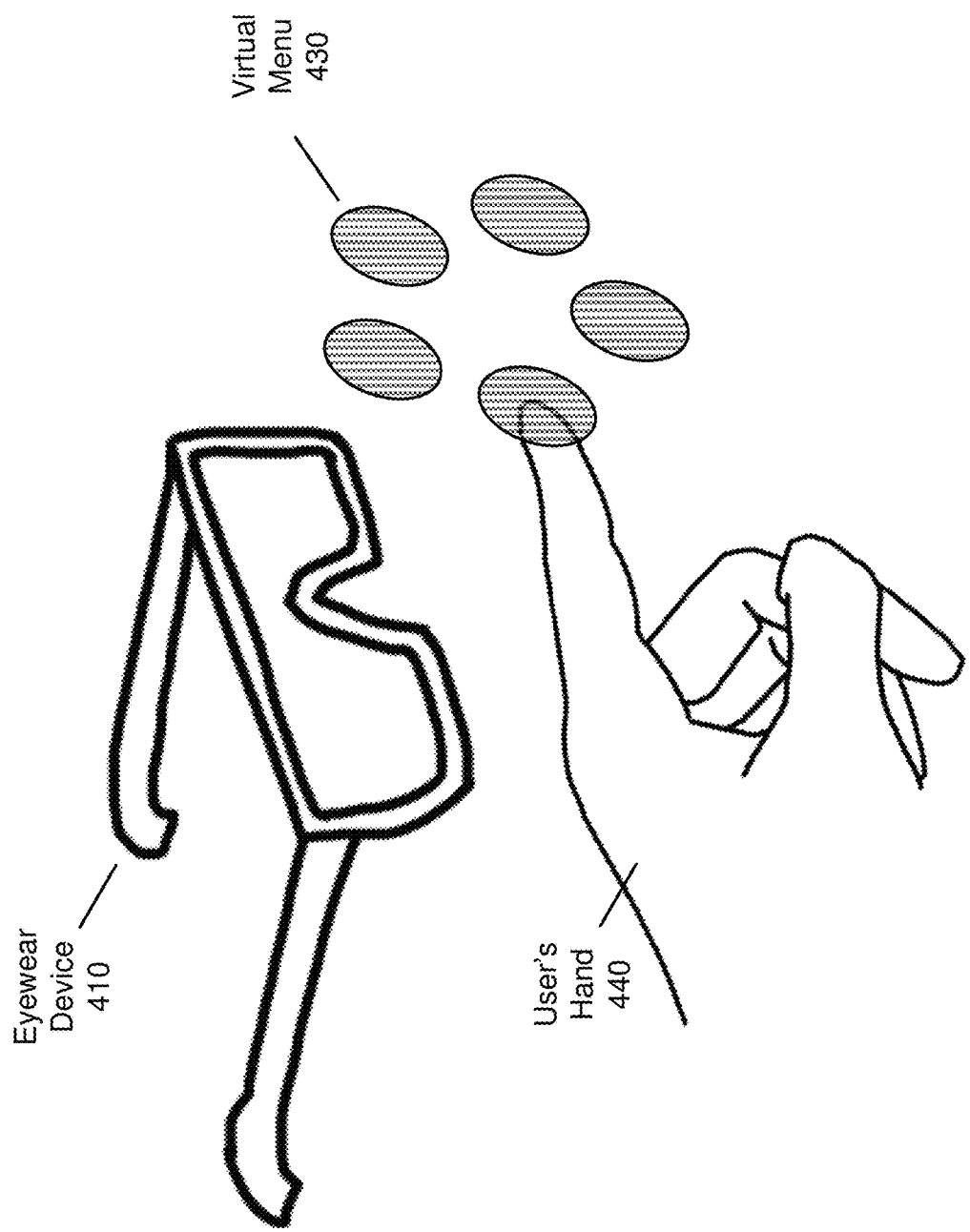
FIG. 4 illustrates an example of a virtual menu that may be displayed to a user by an eyewear device, in accordance with one or more embodiments.
Figure 5:
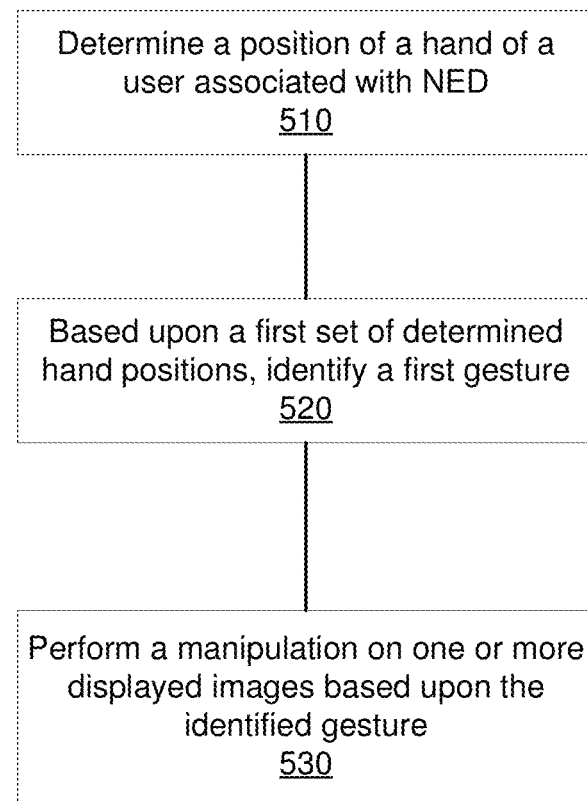
FIG. 5 is a flowchart of an example process for manipulating an artificial reality environment based upon identified gestures, in accordance with one or more embodiments.
Figure 6B:
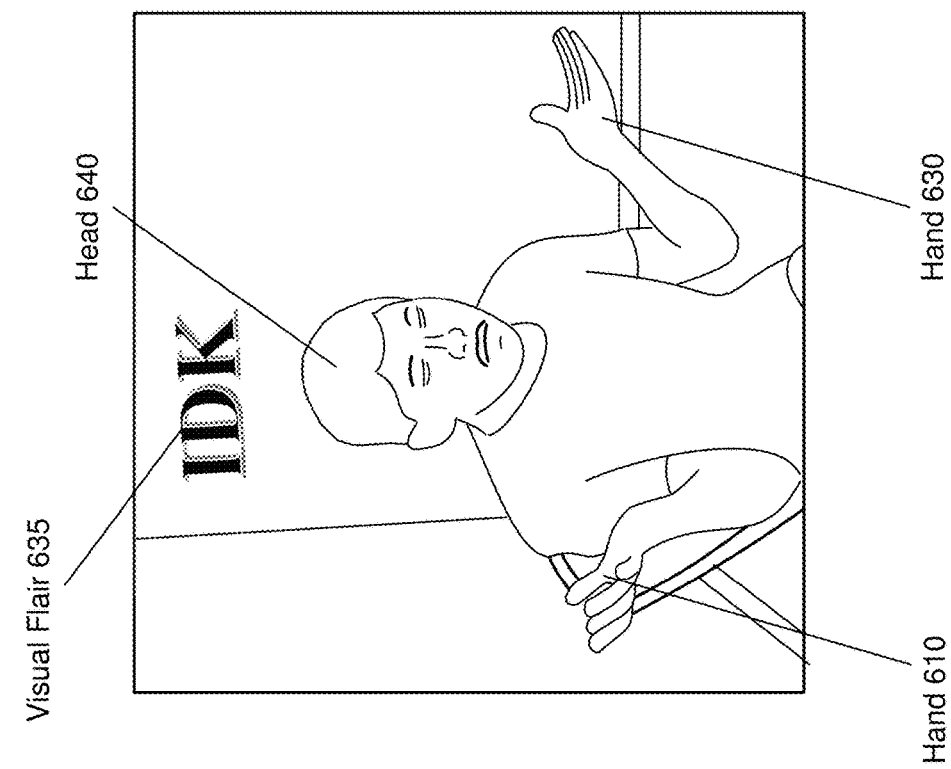
FIG. 6B illustrates an example of visual flair that may be displayed in response to other types of gestures, in accordance with one or more embodiments.
Figure 6A:
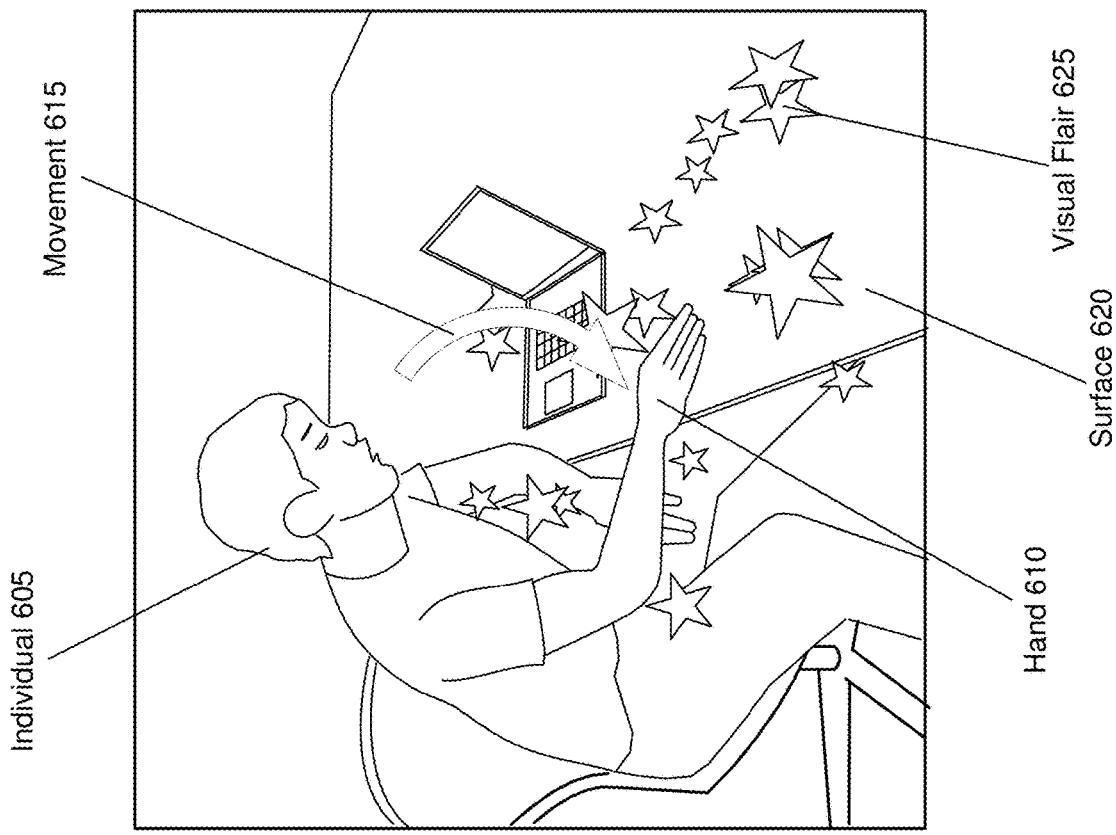
FIG. 6A illustrates a visual flair displayed to demonstrate impact based upon a gesture of an individual within the local area interacting with an object in the local area, in accordance with one or more embodiments.
Figure 7:
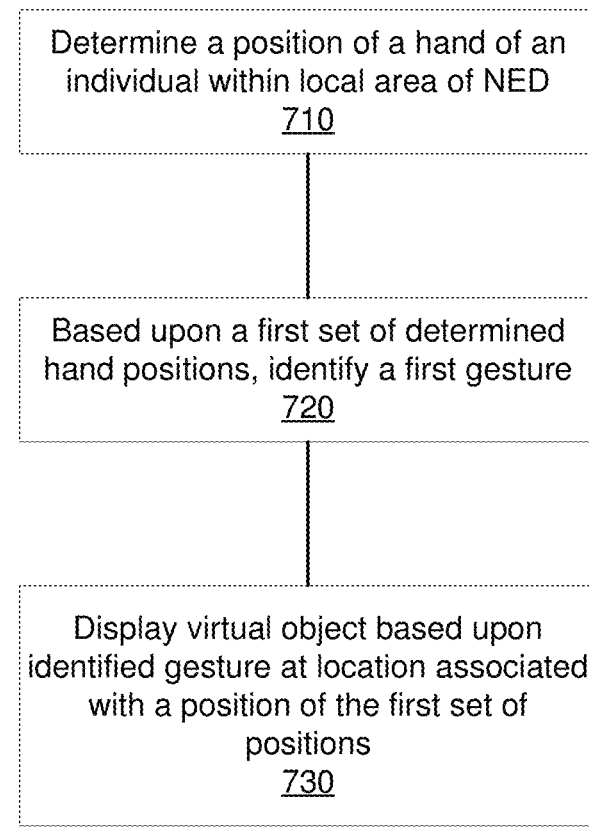
FIG. 7 is a flowchart of an example processing for displaying a visual flair, in accordance with one or more embodiments.

The execution engine 385, in response to receiving from the tracking module 360 an indication of certain gestures, may execute certain instructions related to one or more of the recognized objects. This may allow for the user to select and manipulate various virtual objects in the AR environment intuitively through the use of gestures. For example, the user may select a virtual object corresponding to a content item within the AR environment using a pinching or grabbing gesture, cast the virtual object onto different locations of the AR environment, share the content associated with the virtual object with other users, and/or manipulate the virtual object using one or more virtual interface elements. In some embodiments, the instructions may be further based upon an eye-gaze direction of the user (as determined by the eye tracker 325), transcribed speech of the user or other individual in the local area (as determined by the speech recognition module 370), and/or some combination thereof. Additional examples of such gestures are described with further detail below with reference to FIGS. 4-7. FIGS. 4-5 describe gestures for selecting virtual interface objects on a displayed virtual menu. FIGS. 6A, 6B, and 7 describe different gestures that may be performed to cause the display of "visual flair."

Although the description below is made primarily with reference to an artificial reality (e.g., an augmented reality) environment, the method described herein can also be applied to a virtual reality environment as well. In the virtual reality environment, the user wears a head mounted device that has an electronic display that does not allow light from the local area to strike the user's eyes. Instead, the user's view includes only what is displayed by the electronic display. In such a case, the eye gaze of the user may be towards a virtual object rather than an object in the local area, and the user may see a virtual representation of his or her hands in the virtual reality environment instead of his or her actual hands.

Virtual Interface in AR

In some embodiments, a near eye display (NED) system (e.g., NED system 300) having object recognition and gesture tracking capabilities may allow the NED system 300 to perform manipulations of the AR environment based upon detected user hand gestures. In some embodiments, the NED 305 presents a user of the NED system with a virtual interface in the AR environment, which may be manipulated by the user using hand gestures.

FIG. 4 illustrates an example of a virtual menu that may be displayed to a user by an eyewear device 410, according to an embodiment. The view in FIG. 4 is of the eyewear device 410 and the AR environment. In one embodiment, the eyewear device 410 includes the NED system 300 described with reference to FIG. 3, and thus includes the controller 310, optical assembly 365, and so on. In other embodiments, the eyewear device 410 corresponds to the NED 305 illustrated in FIG. 3, and does not include the controller 310. The optical assembly 365 of the eyewear device 410 may display the virtual menu 430 in the artificial environment to the user. The virtual menu 430 is represented here by a ring of circular objects, with each circle representing a virtual menu option. However, in other embodiments, they may take on other shapes and features. For example, they could be spheres, cubes, text, or shaped (e.g., skeuomorphically) like real-world objects such as buttons, etc.

The controller 310 may further detect that the user's hand 440 is performing a touch gesture with one of the virtual menu options. A touch gesture is detected when the controller 310 detects that the distal end of one of the user's fingers is within a threshold distance of one of the virtual menu options (e.g., 2 mm) in the artificial reality environment. Once the touch gesture is detected, the controller 310 may execute an option corresponding to the selected or touched virtual menu option.

In some embodiments, the controller 310 is configured to be able to identify different types of gestures that may be performed by the user. As used herein, a "gesture" may refer to any series of one or more movements or positions of the user's hand 440 able to be identified or categorized by the controller 310. In some embodiments, a gesture comprises a sequence of multiple motions of the user's hand 440. In some embodiments, a gesture also corresponds to a particular position or orientation of the user's hand 440. The controller 310 may, in response to an identified gesture, execute one or more operations manipulating the artificial reality environment, based upon the specific gesture identified. As used herein, motions or positions of the user's hand may encompass particular motions or positions of the fingers/digits of the user's hand.

In some embodiments, the controller 310 detects a pinch-pull gesture with one of the virtual menu options. The pinch-pull gesture is detected when the distal ends of the user's index finger and thumb are within a threshold distance of each other (e.g., 5 mm) and they surround one of the virtual menu options. Furthermore, the user's hand moves in a direction towards the eyewear device 410 (i.e., that reduces the distance between the user's hand and the eyewear device). This type of gesture may be used for a virtual menu option that indicates a status indicator for the user. Upon detecting such a gesture, the controller 310 may apply the status indicator indicated by the selected virtual menu option to the user. For example, the virtual menu option may indicate a status indicator of "busy." If the user pinches this option and pulls it towards the user, the controller 310 may apply the "busy" status indicator to the user, and transmit this status to an online system. In some embodiments, other users with eyewear devices can subsequently see this updated status (which may be updated in real time) for the user. In other embodiments, the virtual menu options are used to manipulate the AR environment displayed to the user, such as by displaying a content item corresponding to the virtual menu option, perform an operation corresponding to the virtual menu option on a displayed content item, and/or the like.

FIG. 5 is a flowchart of an example process for manipulating an artificial reality environment based upon identified gestures, in accordance with one or more embodiments. As discussed above, in some embodiments, a NED system (e.g., the NED system 300) may comprise an imaging device (e.g., imaging device 315) or other type of sensor able to capture a representation of the user's hands over time for use in tracking the user's hands. A controller (e.g., the controller 310) may perform one or more manipulations of the artificial reality environment displayed to the user through the eyewear device, based upon the tracked position and movement of the user's hands (e.g., using the tracking module 360).

The controller determines 510 a position of a hand of the user associated with the NED system. In some embodiments, the position of the hand determined by the controller may comprise a position of the user's hand relative to the user's body, a position of the user's hand relative to their other hand, a position of the fingers of the user's hand(s), or any combination thereof.

The controller identifies 520 a first gesture, based upon a first set of determined hand positions. In some embodiments the controller tracks the position of the user's hand over time to determine a movement of the user's hand. The first gesture may correspond to a sequence of one or more determined movements of the user's hand. In some embodiments, the controller identifies a pulling gesture or a pushing gesture when it detects movement of the user's hand on a path towards or away from the user's body, respectively.

The first gesture may be identified based upon a determined position or pose of the user's hand(s). In an embodiment, the controller, in response to determining that the user's hands are on either side of their body, with their palms turned upwards, identifies a shrug gesture.

In some embodiments, identifying the first gesture comprises identifying that the user's hand moves to a particular location relative to a real-world object (e.g., the user's body or some other object within the local area) or a virtual object displayed in the artificial reality environment during a particular portion of the gesture, and/or achieves a particular pose at the particular location. In some embodiments, the controller, as part of identifying a pulling gesture, determines that the position of the user's hand at the start of the pulling gesture corresponds to a particular displayed virtual object.

The controller performs 530 a manipulation of the artificial reality environment, based upon the identified gesture. In some embodiments, the controller causes the eyewear device to display a new virtual object as part of the artificial reality environment, change an existing virtual object (e.g., how the virtual object is displayed, and/or a setting of the virtual object), and/or the like. In some embodiments, the controller, in response to the identified gesture, changes a setting associated with the NED system 300 (e.g., a status of the user, a setting of a piece of data associated with the user, and/or the like), communicate with another system (e.g., through the communication module 375) such as a controller associated with a real-world object in the local area or another NED system 300, and/or the like. In some embodiments, the manipulation is based upon a position of the user's hand a particular point in time during the gesture (e.g., in relation to a virtual object, a real-world object, and/or the like). Examples of specific gestures and their effects are described in greater detail below.

Displaying Visual Flairs in Response to Detected Gestures

In some embodiments, the controller may be configured to display certain types of visual flairs in response to detected gestured by the user and/or other individuals. As used herein, a "visual flair" may refer to one or more non-interactive virtual objects displayed to a wearer of a near-eye display, in response to the detection of a particular gesture by an individual within the local area. Visual flairs may be displayed to accentuate, stylize, or provide emphasis to gestures performed by individuals within the local area (e.g., the wearer of the NED, or other individuals in the local area), provide additional context to gestures, and/or the like, and typically are only displayed during the duration of the gesture or for a short amount of time following the completion of the gesture. Different visual flairs may be mapped to different types of gestures, and may be displayed having properties (e.g., number of objects, movement of objects, etc.) based upon one or more properties of the detected gesture (e.g., speed of gesture, movement range of gesture, etc.).

FIGS. 6A and 6B illustrates different types of visual flairs that may be displayed in response to different types of gestures, in accordance with one or more embodiments. The scenes illustrated in FIGS. 6A and 6B correspond to the perspective of an NED being worn by a wearer (not shown).

FIG. 6A illustrates a visual flair displayed to demonstrate impact based upon a gesture of an individual within the local area interacting with an object in the local area, in accordance with some embodiments. The NED system 300 may detect the presence of an individual 605 within a field of view of the NED 305. In some embodiments, the individual 605 may be identified based upon one or more facial recognition and/or object recognition algorithms based upon images captured by the NED system 300. In other embodiments, the individual 605 is identified based upon a sensor or transmitter associated with the individual 605 (not shown), such as another NED worn by the individual 605, a watch or other wearable configured to transmit a signal receivable by the NED system 300 indicating the presence of the individual 605, and/or the like.

The NED system 300 tracks the position of the individual's hand 610 to determine a movement 615 of the hand 610 (e.g., using the tracking module 360). In addition, the NED system 300 may identify one or more objects in the local area, such as the table 620, and determine an interaction between the hand 610 and the identified objects. FIG. 6A illustrates the individual 605 performing a "slapping surface" gesture in which they (a) perform a movement 615 of their hand 610 over at least a threshold distance with at least a threshold speed, such that (b) their hand 610 moves on a path that intersects a surface of an object in the local area (e.g., the table 620). In addition, the path of the movement 615 travelled by the hand 610 near the point of impact with the surface of the table 620 may need to be substantially orthogonal to the surface of the table 620. In some embodiments, the hand 610 must also be oriented such that the palmar side of the hand 610 strikes the surface of the table 620, and not the dorsal side of the hand 610 or the edge of the hand 610 (i.e., a surface of the hand 610 orthogonal to the palmar and dorsal sides). As such, the NED system 300 may determine that the individual 605 performed the "slapping surface" gesture based upon the detection of the movement 615 of the hand 610 (having at least the threshold distance and/or speed) in conjunction with the impact of the hand 610 striking the surface of the table 620 (with the correct orientation).

In response to identifying the gesture, the controller 310 of the NED system 300 transmits display instructions to the optical assembly 320 of the NED system 300, to display a visual flair within the AR environment to the user who is wearing the NED 305, based upon the identified gesture, at a location associated with the identified gesture. As illustrated in FIG. 6A, the NED system, in response to identifying the "slapping surface" gesture, displays a visual flair 625 comprises a plurality of impact stars emanating from a location corresponding to where the hand 605 struck the table surface 620. In some embodiments, the impact stars of the visual flair 625 may travel for a particular distance and/or fade as they travel further from the impact location.

One or more properties of the displayed visual flair 625 may be based upon one or more parameters of the identified gesture. In the embodiment illustrated in FIG. 6A, the number and/or size of the impact stars, the speed at which the impact stars emanate, or the distance travelled by the impact stars may be based upon (e.g., proportional to) a speed of the movement 615. In some embodiments, the direction at which the impact stars emanate may be based upon the surface of the table 620 (e.g., substantially parallel to the surface).

FIG. 6B illustrates an example of visual flair that may be displayed in response to other types of gestures, in accordance with one or more embodiments. As discussed above, certain types of gestures may be identified based upon the relative position of an individual's hands. For example, as illustrated in FIG. 6B, the individual's 605 hands 610 and 630 are positioned on either side (i.e., left and right) of the individual's body within a particular height range (e.g., between the individual's stomach and shoulders), with elbows facing downwards and palms facing upwards (i.e., towards the individual's head). The NED system 300 may determine a "shrug" gesture in response to the hands 610 and 630 remaining within a threshold proximity of the position for at least a threshold amount of time. In some embodiments, the "shrug" gesture is identified in response to the hands 610 and 630 performing an up-and-down vertical movement from the identified position over less than a threshold distance.

In response to detecting the "shrug" gesture, the NED system 300 displays a visual flair 635 corresponding to the gesture, such as the letters "IDK" ("I Don't Know") at a location within a threshold distance above the individual's head 640.

In some embodiments, the visual flair displayed by the NED system 300 is based upon detection of one or more sounds captured by the audio sensors 345 contemporaneously with (i.e., within a threshold delay of) detection of the gesture. In the embodiment illustrated in FIG. 6A, if the sound of the hand 610 impacting the table 620 produces a sound consistent with striking a hard surface, a first type of visual flair may be displayed that is different from a type of visual flair that may be displayed in response to detection of a sound consistent with impact on a soft surface.

In other embodiments, the speech recognition module 370 of the NED system 300 transcribes speech based upon sound by the audio sensors 345, and the NED system 300 displays visual flair based upon the transcribed speech. The individual 605 may be speaking while also performing a gesture. The speech recognition module 370 of the NED system 300 may transcribe the speech and display a visual flair based upon the transcription and the identified gesture. In some embodiments, the individual 605, while speaking, may perform a "underlining" gesture comprising moving their hand 610 over a straight horizontal path (parallel to the surface of the Earth) at between stomach and shoulder height of the user over at least a threshold distance and with the movement of the user's hand within a particular speed range. In some embodiments, the "underlining" gesture may further comprise the gaze direction of the individual's eye changing based upon the movement of the individual's hand 610 (e.g., intersecting a location within a threshold distance above the individual's hand during the performance of the gesture). In response, the NED system 300 may display a transcription of one or more words spoken by the individual at a location corresponding to the gesture as the individual's hand continues to move along the horizontal path. The location may correspond to a predetermined distance above the horizontal path being traversed by the individual's hand, and may following the individual's hand as it continues to move along the horizontal path, such that the transcription text is displayed (e.g., one letter or word at a time) above the individual's hand. In some embodiments, the portion of the individual's speech transcribed and displayed may be determined based upon one or more pauses of at least a threshold duration by the individual when speaking, a tone or pitch of the user's speech, and/or a distance travelled by the hand 610 when performing the "underlining" gesture. While FIGS. 6A and 6B illustrate visual flair being displayed based upon gestures performed by other individuals within the local area of the wearer of the NED, in some embodiments, the NED system 300 is also configured to display visual flair to the wearer of the NED based upon gestures performed by the wearer. For example, the NED system 300 may display visual flair 625 comprising impact stars in the AR environment, responsive to detecting that the wearer of the NED has performed a "slapping surface" gesture similar to that illustrated in FIG. 6A.

In some embodiments, visual flair may also include one or more audio effects. For example, the NED 305 worn by the wearer may comprise one or more speakers or other audio devices configured to play audio content to the wearer. In response to identifying particular gestures, the NED system may play audio content to the wearer in conjunction with displaying visual flair, where the audio content may serve to accentuate or provide emphasis to the performed gesture or to the displayed flair. For example, the NED system may, in response to detecting a shrug gesture performed by the individual 605, may play a sound associated with the shrug gesture in addition to displaying the visual flair 635.

FIG. 7 is a flowchart of an example processing for displaying a visual flair, in accordance with one or more embodiments. The NED system 300 determines 710 a position of a hand within a local area of the NED system 300. In some embodiments, the hand corresponds to a hand of the user of the NED system 300. In other embodiments (e.g., as illustrated in FIG. 6), the hand may correspond to a hand of another individual within the local area. For example, the NED system 300 may comprise an imaging device able to identify the presence of individuals other than the user of the NED system 300 within the local area. In response to identifying an individual (e.g., using an object recognition and/or face recognition algorithm), the NED system 300 identifies a location of a hand of the individual.

The NED system 300 identifies 720, based upon a first set of determined hand positions, a first gesture. In some embodiments, a gesture corresponds to a particular position of the hand (e.g., relative to the individual's body, the individual's other hand, and/or one or more other objects in the local area). The NED system 300 may identify a particular gesture based upon a determination that the hand of the individual has maintained a particular position for at least a threshold period of time. In some embodiments, the NED system determines one or more movements of the hand based upon the first set of positions, and identify a gesture based upon at least a portion of the determined movements. In some embodiments, an identified gesture may correspond to a combination of identified movements and maintained positions.

The NED system 300 displays 730 one or more virtual objects in the AR environment, based upon the identified first gesture, at a location associated with a position of the first set of determined positions. In some embodiments, the one or more virtual objects may be referred to as a visual flair. The NED system 300 may map different types of gestures to different types of virtual flair, such that the virtual flair displayed will correspond to the specific detected gesture. Each virtual flair corresponding to a particular gesture may be selected in order to emphasize the gesture, provide additional context to the gesture, and/or otherwise add visual excitement to the AR environment that compliments the gestures of the individuals within the local area. The virtual flair is displayed at a location based upon the detected gesture, and may have one or more properties based upon one or more parameters of the gesture (e.g., an intensity of the displayed visual flair may be based upon a movement speed associated with the gesture). In some embodiments, the virtual flair may further be based upon one or more sensor readings (e.g., captured sounds, speech) captured contemporaneously as the performed gesture.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
    a near eye display (NED) comprising:
        an optical assembly having an electronic display that is configured to display images corresponding to virtual objects in accordance with display instructions to a first individual corresponding to a wearer of the NED;
        an imaging device configured to capture one or more images of a portions of a local area of the NED; and
    a controller configured to:
        analyze the one or more captured images using a trained model to identify a plurality of hand poses associated with a hand of a second individual located within the local area different from the first individual;
        identify a first gesture performed by the hand of the second individual based upon identifying from the plurality of identified hand poses a predetermined sequence of hand poses over time comprising a movement by the hand of the second individual with at least a threshold speed over a path having at least a threshold distance;
        identify a portion of the second individual's body, based upon the identified first gesture; and
        update the display instructions to cause the electronic display to display, in an augmented reality environment as presented to the first individual via the electronic display, one or more virtual objects to accentuate the identified first gesture displayed at a location corresponding to the identified portion of the second individual's body, wherein a property of the displayed one or more virtual objects is based upon a movement speed of the identified first gesture;
    wherein the controller is further configured to, responsive to determining that the first gesture is of a certain type:
        identify a first sound in the local environment detected within a threshold period of time of the identified first gesture;
        select the one or more virtual objects to be displayed based upon the first sound; and
        display the one or more virtual objects along a path based upon the path of the hand of the second individual during the first gesture.

2. The system of claim 1, wherein the path of the first gesture intersects a surface of an object within the local area, such that a palmar surface of the hand of second individual impacts the surface.

3. The system of claim 2, wherein the one or more virtual objects are displayed as travelling in directions based upon a plane defined by the surface of the object.

4. The system of claim 1, wherein the first gesture comprises a hand position in which the hands of the second individual are located in predetermined positions relative to each other and maintain their positions for at least a threshold period of time.

5. The system of claim 1, further comprising an audio sensor configured to detect the first sound in the location environment.

6. The system of claim 5, wherein the one or more virtual objects comprises content based upon a transcription of the first sound.

7. The system of claim 1, further comprising an audio device configured to play audio content to the first individual, and the controller is further configured to cause the audio device to play audio content to the first individual based upon the first gesture contemporaneously with the electronic display displaying the one or more virtual objects.

8. The system of claim 1, wherein the controller is further configured to:
    analyze the one or more captured images using the trained model to identify one or more joint positions associated with the hand of the second individual; and
    convert the identified one or more joint positions into a hand pose.

9. The system of claim 1, wherein the first gesture corresponds to a predetermined sequence of hand poses over time in which a movement of the hand exceeds a threshold speed.

10. The system of claim 1, wherein the controller is further configured to identify the first gesture based upon a position of the hand of the second individual relative to the second individual's body as indicated by the plurality of hand poses.

11. The system of claim 1, wherein the one or more virtual objects to be displayed are selected based upon a movement speed of the hand as determined based upon the plurality of hand poses.

12. The system of claim 1, wherein a rate at which the one or more virtual objects are displayed or a rate of movement of the one or more virtual objects is based upon a movement speed of the hand as determined based upon the plurality of hand poses.

13. The system of claim 1, wherein the property of the displayed one or more virtual objects based upon the movement speed of the identified first gesture comprises at least one of: a number of the one or more virtual objects, a movement of the one or more virtual objects, a displayed size of the one or more virtual objects, a rate at which the one or more virtual objects are displayed, and a displayed intensity of the one or more virtual objects.

14. The system of claim 1, wherein a value of the property of the displayed one or more virtual objects is proportional to the movement speed of the identified first gesture.

15. The system of claim 1, wherein a number of the one or more virtual objects displayed is based upon a movement speed of the identified first gesture.

16. A system comprising:
a near eye display (NED) comprising:
  an optical assembly having an electronic display that is configured to display images corresponding to virtual objects in accordance with display instructions;
  an imaging device configured to capture one or more images of a portions of a local area of the NED;
  an audio sensor configured to detect audio information corresponding to sounds in the local environment; and
a controller configured to:
  analyze the one or more captured images using a trained model to identify a plurality of hand poses associated with a hand of an individual located within the local area different from a wearer of the NED;
  identify a first gesture performed by the hand of the individual based upon identifying from the plurality of identified hand poses a predetermined sequence of hand poses over time comprising a movement by the hand of the second individual with at least a threshold speed over a path having at least a threshold distance;
  using the audio sensor, identify a first sound in the local environment detected within a threshold period of time of the identified first gesture; and
  update the display instructions to cause the electronic display to display, in an augmented reality environment as presented to the wearer of the NED via the electronic display, one or more virtual objects to accentuate the identified first gesture displayed at a location associated with a predetermined portion of the individual's body associated with the first gesture, wherein the one or more virtual objects are selected based upon the first gesture and the first sound, and a property of the displayed one or more virtual objects is based upon a movement speed of the identified first gesture;
  wherein the controller is further configured to, responsive to determining that the first gesture is of a certain type, display the one or more virtual objects along a path based upon the path of the hand of the second individual during the first gesture.

17. The system of claim 16, wherein the one or more virtual objects comprises content based upon a transcription of the first sound, the one or more virtual objects displayed aligning with the path of the hand of the individual during the first gesture.

* * * * *